(12) United States Patent
Baldwin et al.

(10) Patent No.: US 10,543,913 B2
(45) Date of Patent: *Jan. 28, 2020

(54) TRI-HYBRID YOKE

(71) Applicant: Bell Helicopter Textron Inc., Fort Worth, TX (US)

(72) Inventors: Tyler Wayne Baldwin, Keller, TX (US); Kyle Thomas Cravener, Watauga, TX (US); Andrew Maresh, Lewisville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/882,287

(22) Filed: Jan. 29, 2018

(65) Prior Publication Data
US 2019/0233096 A1    Aug. 1, 2019

(51) Int. Cl.
*B64C 27/33* (2006.01)
*B64C 27/35* (2006.01)
*B64C 27/48* (2006.01)
*B64C 27/50* (2006.01)
*B64C 29/00* (2006.01)

(52) U.S. Cl.
CPC .............. *B64C 27/33* (2013.01); *B64C 27/35* (2013.01); *B64C 27/48* (2013.01); *B64C 27/50* (2013.01); *B64C 29/0033* (2013.01)

(58) Field of Classification Search
CPC ......... B64C 27/32; B64C 27/33; B64C 27/35; B64C 27/48; B64C 27/50
See application file for complete search history.

(56) References Cited

U.S. PATENT DOCUMENTS

| | | | | |
|---|---|---|---|---|
| 3,330,362 A | * | 7/1967 | Kastan | B64C 27/33 416/100 |
| 4,012,169 A | * | 3/1977 | Mouille | B64C 27/33 416/134 A |
| 4,986,735 A | * | 1/1991 | Robinson | B64C 27/35 416/134 A |
| 5,059,094 A | * | 10/1991 | Robinson | B64C 27/33 416/134 A |
| 5,110,259 A | * | 5/1992 | Robinson | F16F 1/393 144/144.1 |
| 8,360,727 B2 | * | 1/2013 | Stamps | B64C 27/32 416/134 A |
| 9,085,357 B2 | * | 7/2015 | Davis | B64C 27/32 |
| 9,308,992 B2 | * | 4/2016 | Cabrera | B64C 27/48 |

(Continued)

FOREIGN PATENT DOCUMENTS

DE     3109690 A1 *  9/1982   ............. B64C 27/35

OTHER PUBLICATIONS

Baldwin, Tyler Wayne, et al., "U.S. Appl. No. 15/881,980" filed Jan. 29, 2018.

*Primary Examiner* — Nathaniel E Wiehe
*Assistant Examiner* — Michael K. Reitz
(74) *Attorney, Agent, or Firm* — Winstead PC

(57) ABSTRACT

A tri-hybrid yoke including a center ring connected to a CF fitting connected to flexure arms. An inboard centrifugal force bearing assembly connects to the CF fitting and a grip. An outboard shear bearing assembly connects to the flexure arm and the grip. In use, the center ring and the CF fittings carry the centrifugal force at a position inboard of the flexure arm.

20 Claims, 6 Drawing Sheets

(56) References Cited

U.S. PATENT DOCUMENTS

| | | | |
|---|---|---|---|
| 9,505,489 B2 | 11/2016 | Sutton et al. | |
| 9,802,698 B2 | 10/2017 | Capelle et al. | |
| 2016/0200433 A1* | 7/2016 | Ferrant | B64C 27/39 416/134 A |
| 2016/0375995 A1* | 12/2016 | Waldo | B64C 27/32 416/204 R |

* cited by examiner

TRI-HYBRID YOKE

CROSS-REFERENCE TO RELATED APPLICATIONS

This patent application is related to U.S. Patent Application Publication US 2019/0233095 A1, entitled Hybrid Yoke, which is incorporated herein by reference in its entirety.

BACKGROUND

This section provides background information to facilitate a better understanding of the various aspects of the disclosure. It should be understood that the statements in this section of this document are to be read in this light, and not as admissions of prior art.

Rotor systems of rotorcraft and tiltrotor aircraft include inboard and outboard bearing assemblies that connect rotor blades to a yoke. The yoke is connected by a hub to a drive mast driven by a power source. The yoke is often manufactured of composite material instead of metal for weight savings. The inboard and outboard bearing assemblies accommodate forces acting on the rotor blades allowing each rotor blade to flex with respect to the yoke/mast and other rotor blades. A particular distance between the inboard and outboard bearing assemblies is dependent on aircraft configuration where each configuration has an optimal distance for that particular aircraft's loads and dynamics. Typically, the outboard bearing assembly includes a centrifugal force ("CF") bearing and a shear bearing connected to both the rotor blade and a tip of a yoke arm while the inboard bearing assembly includes a shear bearing connected to both the rotor blade and the yoke in a cut-out proximate the drive mast. CF loads can be significantly greater than shear loads. The CF bearing which accommodates the CF load is typically outboard at the tip of the yoke arm since the cut-out in the yoke compromises the strength of the yoke and provides a common yoke failure point.

SUMMARY

An example of a tri-hybrid yoke for a rotorcraft includes a center ring connected to a centrifugal force ("CF") fitting at a first CF joint, a flexure arm connected to the CF fitting, a second CF joint positioned within the CF fitting proximate the center ring and inboard of the flexure arm, and the center ring, the first CF joint, the CF fitting, and the second CF joint carry a CF load upon rotation of the tri-hybrid yoke.

An example of a rotor blade assembly of a rotorcraft includes a center ring including a central aperture, a drive shaft connected to the center ring at the central aperture, a centrifugal force ("CF") fitting to the center ring at a CF joint, a flexure attached to the CF fitting opposite the center ring, a CF bearing connected to the CF fitting, a rotor blade connected to the CF bearing, an outboard shear bearing connected to the flexure and the rotor blade, and a CF load path of the rotor blade assembly through the CF bearing, the CF fitting, the CF joint, and the center ring.

An example of a tri-hybrid yoke for a rotorcraft includes a center ring connected to a centrifugal force ("CF") fitting, a flexure arm connected to the CF fitting, a cut-out in the CF fitting, inboard of the flexure arm, including a CF pocket, a first curved surface formed in the CF pocket, an inboard beam including a shaft extending from a bridge and a second curved surface in the bridge opposite the shaft, a CF bearing held by and between the first curved surface and the second curved surface, and the CF bearing is axially centered within the first curved surface and the second curved surface when the CF bearing is under compression by a CF load.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
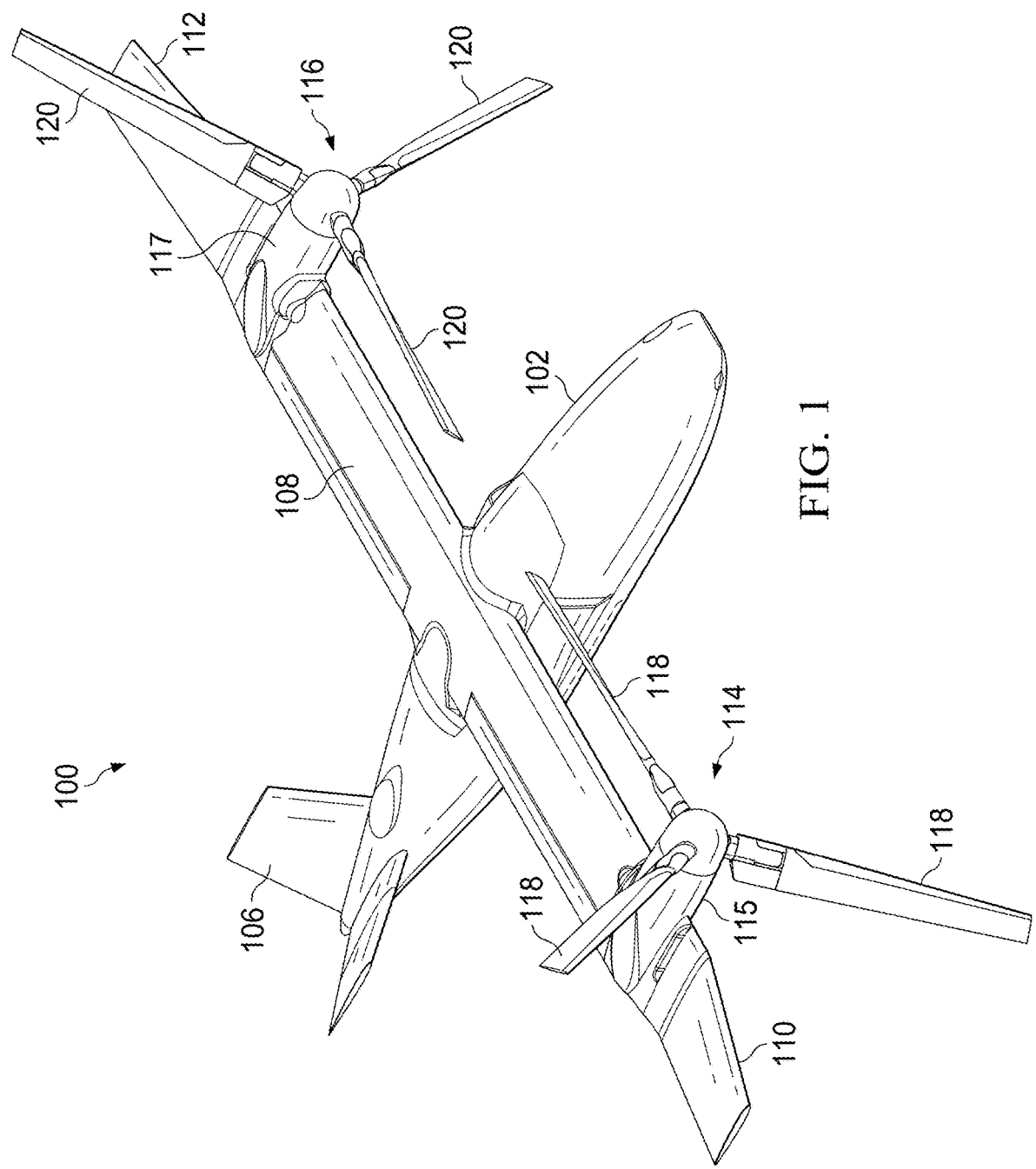
FIG. 1 is a perspective view of a tiltrotor aircraft in a flight ready position according to aspects of the disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

Figure 2:
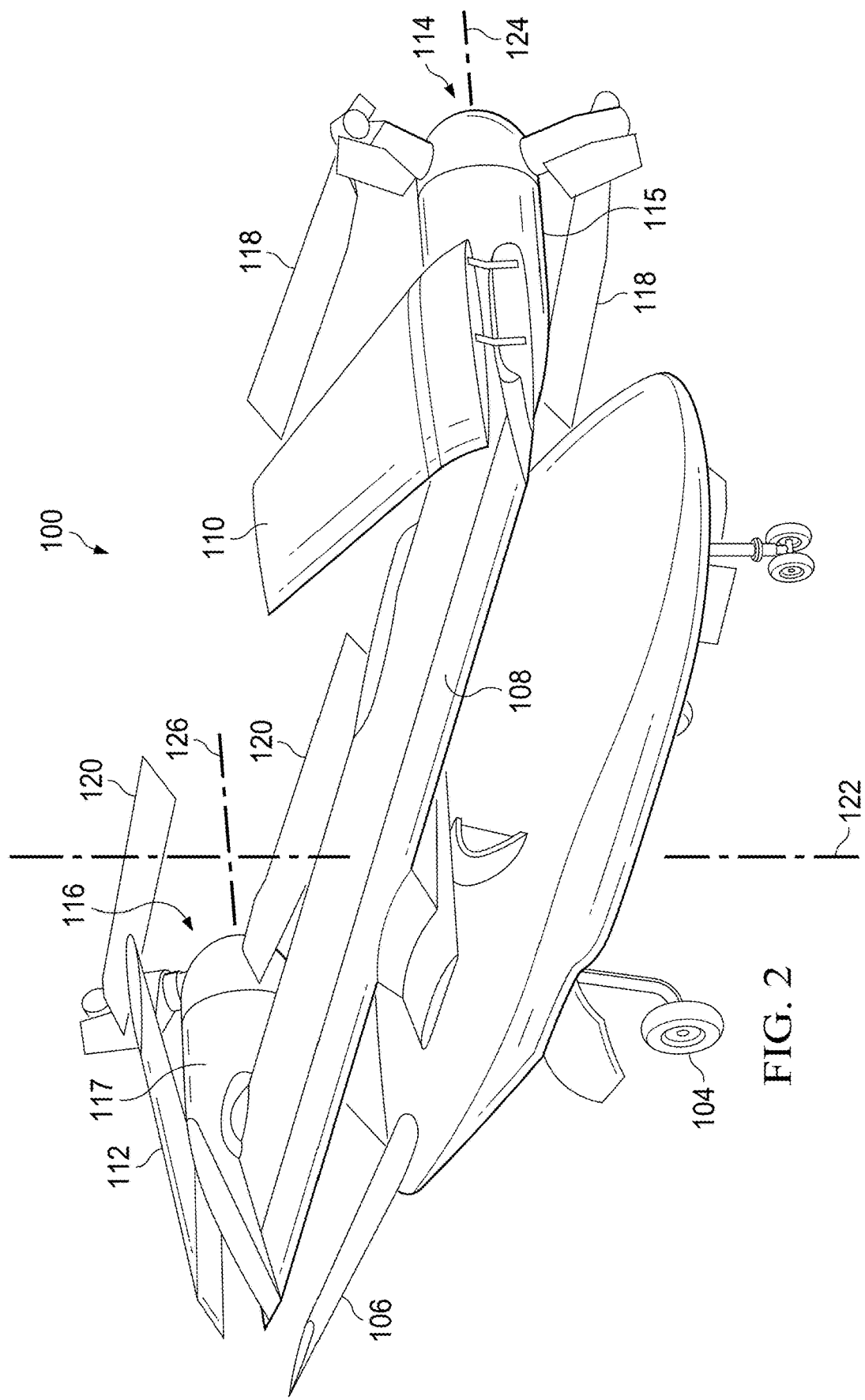
FIG. 2 is a perspective view of a tiltrotor aircraft in a stowed position according to aspects of the disclosure.

Referring to FIGS. 1 and 2, an illustrative tiltrotor aircraft 100 is shown. Tiltrotor aircraft 100 includes fuselage 102, landing gear 104, tail member 106, wing 108, wing tip 110, wing tip 112, rotor system 114, and rotor system 116. Rotor system 114 is connected to nacelle 115 located on an end portion of wing 108 proximate wing tip 110, while rotor system 116 is connected to nacelle 117 located on an opposite end portion of wing 108 proximate wing tip 112. Wing tip 110 is pivotable at a location on wing 108 outboard of nacelle 115. Wing tip 112 is pivotable at a location on wing 108 outboard of nacelle 117. Nacelles 115 and 117 are pivotable between a helicopter mode where the rotor systems are generally vertical and an airplane mode where the rotor systems are generally horizontal. Nacelle 115 and nacelle 117 are substantially symmetric of each other about fuselage 102. Rotor system 114 includes a plurality of foldable rotor blades 118. Rotor system 116 includes a plurality of foldable rotor blades 120. Rotor blades 118 and 120 may rotate in opposite directions to cancel the torque associated with the operation of each rotor system 114 and 116. The angle of the pivotable nacelles 115 and 117 relative to the wing, as well as the pitch of rotor blades 118 and 120, can be adjusted in order to selectively control direction, thrust, and lift of tiltrotor aircraft 100. Further, rotor systems 114 and 116 are illustrated in the context of tiltrotor aircraft 100; however, a singular rotor system with foldable or non-foldable rotor blades can be implemented on other non-tilting rotor and helicopter rotor systems. It should also be appreciated that teachings from tiltrotor aircraft 100 may apply to other aircraft such as airplanes and unmanned aircraft which would benefit from folding rotor blades.

Fuselage 102 represents the body of tiltrotor aircraft 100 and may be coupled to rotor systems 114 and 116 such that the rotor systems with rotor blades 118 and 120 may move tiltrotor aircraft 100 through the air. Landing gear 104 supports tiltrotor aircraft 100 when tiltrotor aircraft 100 is landing or when tiltrotor aircraft 100 is at rest on the ground. Vertical axis 122 is generally perpendicular to the longitudinal axis of the wing and is generally positioned at the intersection of the fuselage and the wing. FIG. 1 represents tiltrotor aircraft 100 in operational flying position in an airplane mode. FIG. 2 represents tiltrotor aircraft 100 in a stowed position where rotor blades 118 have been folded generally parallel with each other and rotor blades 120 have been folded generally parallel with each other in order to reduce the profile of the aircraft. In the stowed position, wing 108 is swivelled approximately 90° to generally align with fuselage 102.

Generally each rotor system includes a drive mast driven by a power source. A rotor system includes a yoke indirectly connected to the drive mast with a hub assembly and rotor blades indirectly connected to the yoke with inboard and outboard bearing assemblies. The bearing assemblies accommodate forces acting on the rotor blades allowing each rotor blade to flex with respect to the yoke/mast and other rotor blades. The weight of the rotor blades and the lift of rotor blades may result in transverse forces on the yoke and other components. Examples of transverse forces may include forces resulting from leading, lagging, and coning of the rotor blades. Leading and lagging generally refers to the movement of a rotor blade in the plane of rotation. Coning generally refers to the upward and downward flexing of a rotor blade out of the plane of rotation due to lift forces acting on the rotor blade. The rotor blades may be subject to other forces, such as axial and feathering forces. Axial forces generally refer to the centrifugal force on the rotor blades during rotation of the rotor blades. Feathering forces generally refer to forces resulting from twisting motions that cause a rotor blade to change pitch. The power source, drive mast, and yoke are components for transmitting torque. The power source may include a variety of components including an engine, a transmission, and differentials. In operation, the drive mast receives torque from the power source and rotates the hub and yoke. Rotation of the yoke causes the rotor blades to rotate with the drive mast and yoke.

Figure 3A:
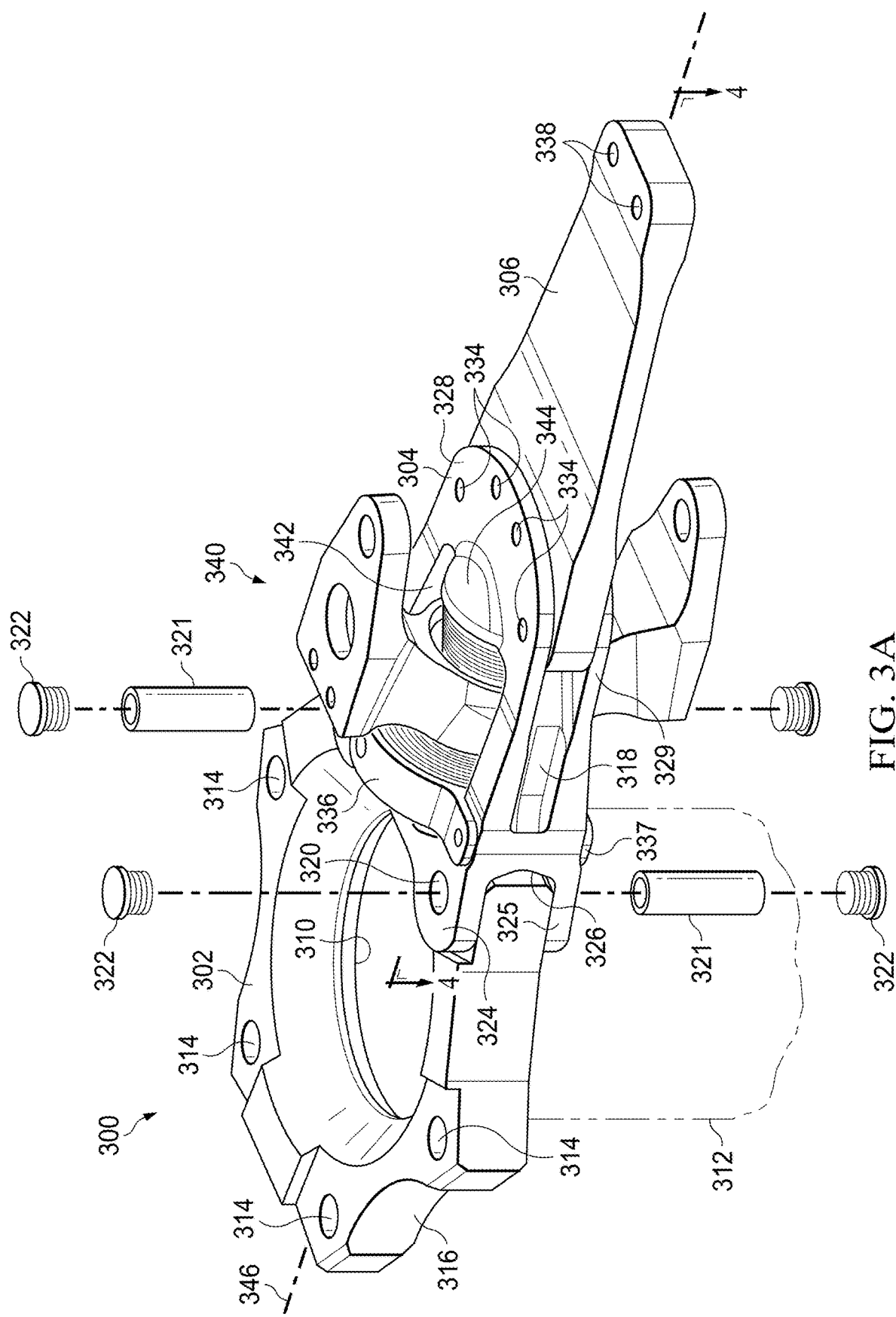
FIG. 3A is a perspective view of a tri-hybrid yoke according to one or more aspects of the disclosure.
Figure 3B:
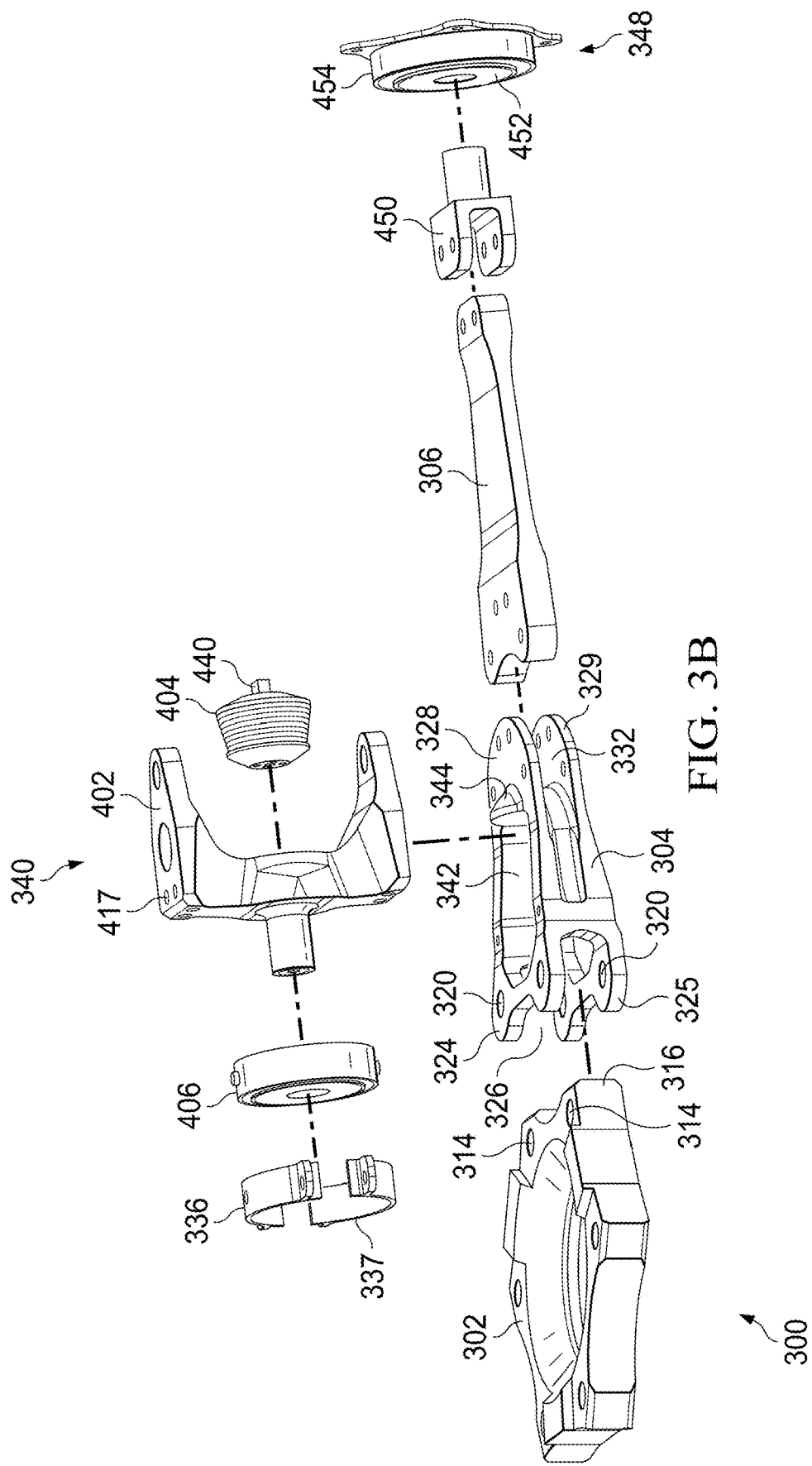
FIG. 3B is an exploded perspective view of a tri-hybrid yoke according to one or more aspects of the disclosure.

Referring to FIGS. 3A and 3B, tri-hybrid yoke 300 is shown. Each rotor system 114, 116 includes a separate tri-hybrid yoke. Tri-hybrid yoke 300 includes a composite center ring, metal centrifugal force ("CF") fittings attached to the center ring, and composite flexure arms attached to the CF fittings. The "tri-hybrid" combination provides the weight savings of composite material for the center ring combined with the strength of metal for the CF fittings with the flexibility of composite for the flexure arms. It should be understood that different metal and composite combinations for the center ring, CF fittings, and the flexure arms may be possible. In the interest of clarity, a single tri-hybrid yoke is described herein with the understanding that tiltrotor aircraft 100 includes a pair of similarly configured tri-hybrid yokes.

Tri-hybrid yoke 300 includes center ring 302, a plurality of CF fittings 304, and a plurality of flexure arms 306. For weight saving purposes, center ring 302 is manufactured of a stiff, fiber-reinforced, polymeric, composite material. For strength purposes, CF fitting 304 is metal and may be manufactured of, for example, aluminum, steel, or titanium.

Each flexure arm 306 is manufactured of a flexible composite material. For flexibility, each flexure arm 306 may be, for example, a composite part constructed from reinforcement material, such as fiberglass suspended in epoxy resin or a rubber compound. Reinforcement material within flexure arm 306 can be oriented to customize how flexure arm 306 responds to certain loads. For example, fiber reinforcement material can be provided at various angles to customize the stiffness of flexure arm 306 in different directions. Reinforcement material can be arranged within flexure arm 306 such that it is stiff axially and laterally to resist centrifugal and lead/lag forces, however flexible vertically in a direction generally parallel with the drive mast to permit coning. Actual flexibility values provided by the constituent materials and arrangement of reinforcement layers are dependent on a particular aircraft's loads and dynamics.

Each CF fitting 304 is connected to center ring 302 such that CF fitting 304 extends radially from central aperture 310. Each CF fitting 304 is generally equally spaced from each other around central aperture 310. Each CF fitting 304 connects to a flexure arm 306. A rotor blade is connected to each CF fitting 304 and flexure arm 306 via inboard and outboard bearing assemblies. For example, in the three rotor blade configuration shown in rotor systems 114 and 116, 120° separates each CF fitting/flexure arm combination and thus each rotor blade. It should also be appreciated that teachings regarding tri-hybrid yoke 300 can apply to rotor systems having greater or fewer rotor blades. It should also be appreciated that teachings regarding tri-hybrid yoke 300 can apply to folding and non-folding rotor systems.

Tri-hybrid yoke 300 is connected to drive mast 312 through central aperture 310 via a hub spring assembly and constant velocity joint. Center ring 302 includes mounting holes 314 in tab 316. Mounting holes 314 and tab 316 are used to connect CF fitting 304 to center ring 302.

CF fitting 304 includes weight pockets 318. Weight pockets 318 reduce the overall weight of tri-hybrid yoke 300 without comprising the strength of CF fitting 304. CF fitting includes mounting holes 320. CF fitting includes tangs 324, 325. Tangs 324, 325 define slot 326 between them. Slot 326 is sized to engage tab 316. Tab 316 is engaged with slot 326 and mounting holes 320 are axially aligned with mounting holes 314. CF bolts 322 seated within bushings 321 in mounting holes 314 and 320 connect CF fitting 304 to center ring 302. Tangs 324, 325 provide a double shear connection to center ring 302. Alternatively, center ring 302 may be a bilateral ring including vertically aligned tangs sized to engage a single tab of the CF fitting to provide the double shear connection.

CF fitting includes tangs 328, 329. Tangs 328, 329 define space 332 between them. Space 332 is sized to engage flexure arm 306. Tangs 328, 329 provide a double shear connection to flexure arm 306. Alternatively, flexure arm 306 may include a set of tangs sized to engage a single tang to provide the double shear connection. Each CF fitting 304 includes mounting holes 334. Mounting holes 334 are used to connect CF fitting 304 to flexure arm 306. The connection between CF fitting 304 and flexure arm 306 does not carry any CF load. Clamp plates 336, 337 are mounted to CF fitting 304 proximate center ring 302. Clamp plates 336, 337 are adjacent to and hold a shear bearing of inboard bearing assembly 340. Each flexure arm 306 includes mounting holes 338. Mounting holes 338 are used to connect flexure arm 306 to outboard bearing assembly 348.

Each CF fitting 304 includes cut-out 342. Cut-out 342 extends from proximate central aperture 310 to tangs 328, 329. Cut-out 342 is sized to allow inboard bearing assembly 340 to fit within cut-out 342. CF pocket 344 is integrally formed with CF fitting 304. CF pocket 344 is a unitary portion of the CF fitting that has a curved surface forming a conical cavity. Each rotor blade connected to CF fitting 304 and flexure arm 306 shares central longitudinal axis 346 with CF fitting 304 and flexure arm 306. The central longitudinal axis of a rotor blade may also be referred to as a blade pitch change axis.

Figure 4:
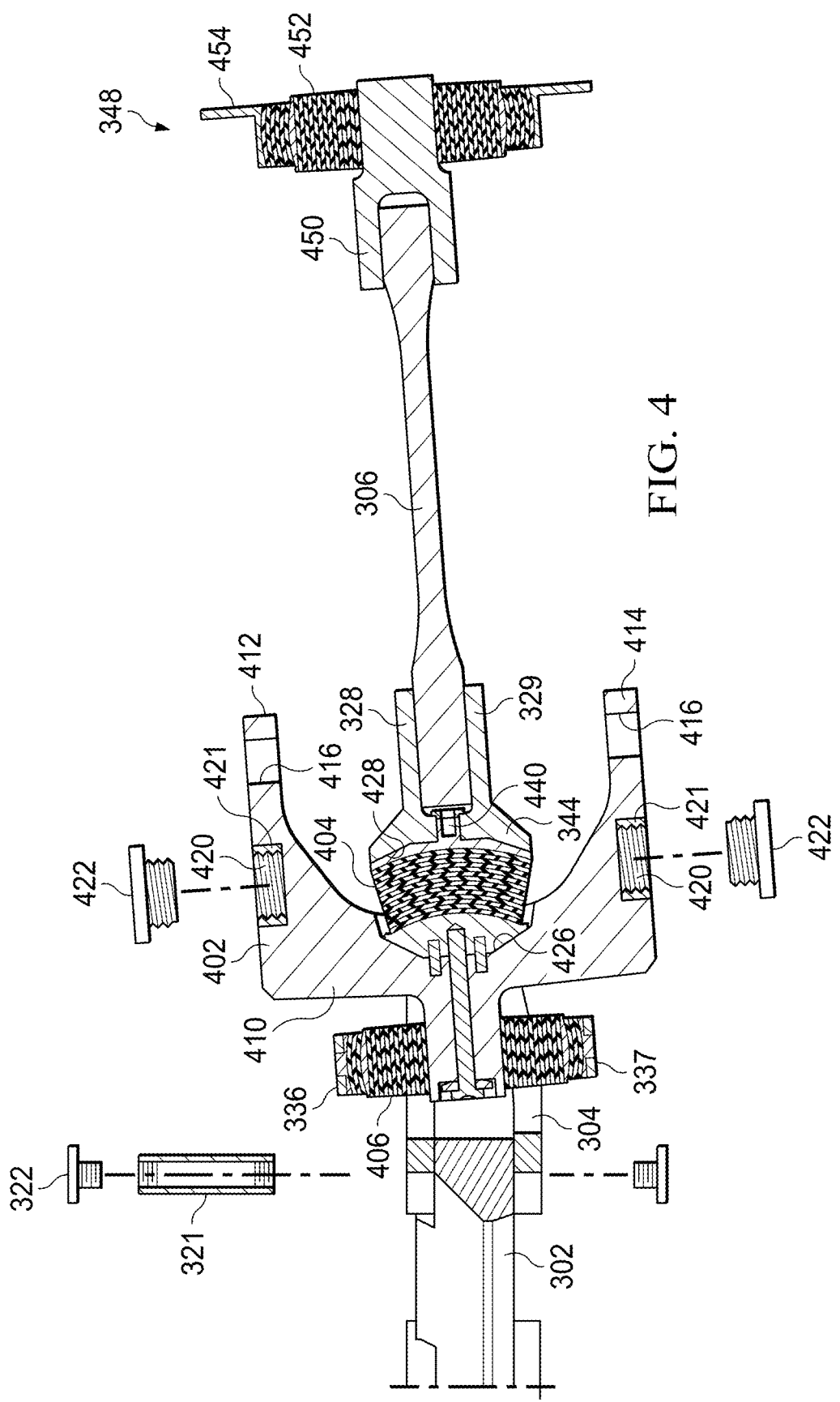
FIG. 4 is a partial sectional view of a tri-hybrid yoke and inboard bearing assembly according to one or more aspects of the disclosure taken along line 4-4 of FIG. 3A.

Referring to FIG. 4, inboard bearing assembly 340 is shown connected to tri-hybrid yoke 300. Inboard bearing assembly 340 includes inboard beam 402, CF bearing 404, and shear bearing 406. The CF and shear bearings are generally elastomeric bearings constructed from a rubber type material that absorb vibration and provide for limited movement of the rotor blades relative to the hybrid yoke and drive mast.

Inboard beam 402 includes bridge 410. Tangs 412, 414 are vertically aligned and extend from bridge 410. Tangs 412, 414 include mounting holes 416, 417. Mounting holes 416, 417 are used to connect grip 502 (FIG. 5) to inboard beam 402. As further discussed below, grip 502 is also connected to an outboard beam which is mounted to flexure arm 306. Tangs 412, 414 include CF mounting hole 420. CF bolt 422 is sized to engage CF bushing 421 seated within CF mounting hole 420 and is used to connect the grip to inboard beam 402. CF bolts 422, CF bushings 421, and CF mounting holes 420 are axially aligned in between tangs 412, 414. Inboard beam 402 includes shaft 424 extending from bridge 410 toward central aperture 310. Shear bearing 406 is attached to shaft 424, for example by vulcanization or adhesive. Clamp plates 336, 337 and shaft 424 hold or constrain shear bearing 406. Inboard beam includes cavity 426 concentrically aligned with shaft 424. Cavity 426 is conical or parabolic shaped and positioned on bridge 410 opposite of shaft 424. CF pocket 344 includes cavity 428. Cavity 428 is conical or parabolic shaped and includes slot 430. Inboard beam 402 is connected to CF fitting 304 via CF bearing 404. CF bearing 404 is held by and between the curved surfaces of cavity 426 and cavity 428. The curved surfaces of cavity 426 and cavity 428 tend to axially center CF bearing 404 within the cavities when CF bearing 404 is under compression from CF loads. It should be understood that, an axially centered CF bearing is when the central longitudinal axis of the CF bearing generally intersects the center points of the curved surfaces of cavity 428 and cavity 426. CF bearing 404 includes tab 440. Tab 440 is sized to engage slot 430. The engagement of tab 440 with slot 430 prevents rotation of CF bearing 404 with respect to CF fitting 304. As an alternative, CF fitting 304 may be replaced with a clevis that extends from CF bearing 404 for connection to tangs 328, 329 to provide the anti-rotation functionality. Outboard bearing assembly 348 includes spindle 450 attached to flexure arm 306. Spindle bearing 452 is mounted to spindle 450 and outboard beam 454 holds spindle bearing 452.

Figure 5:
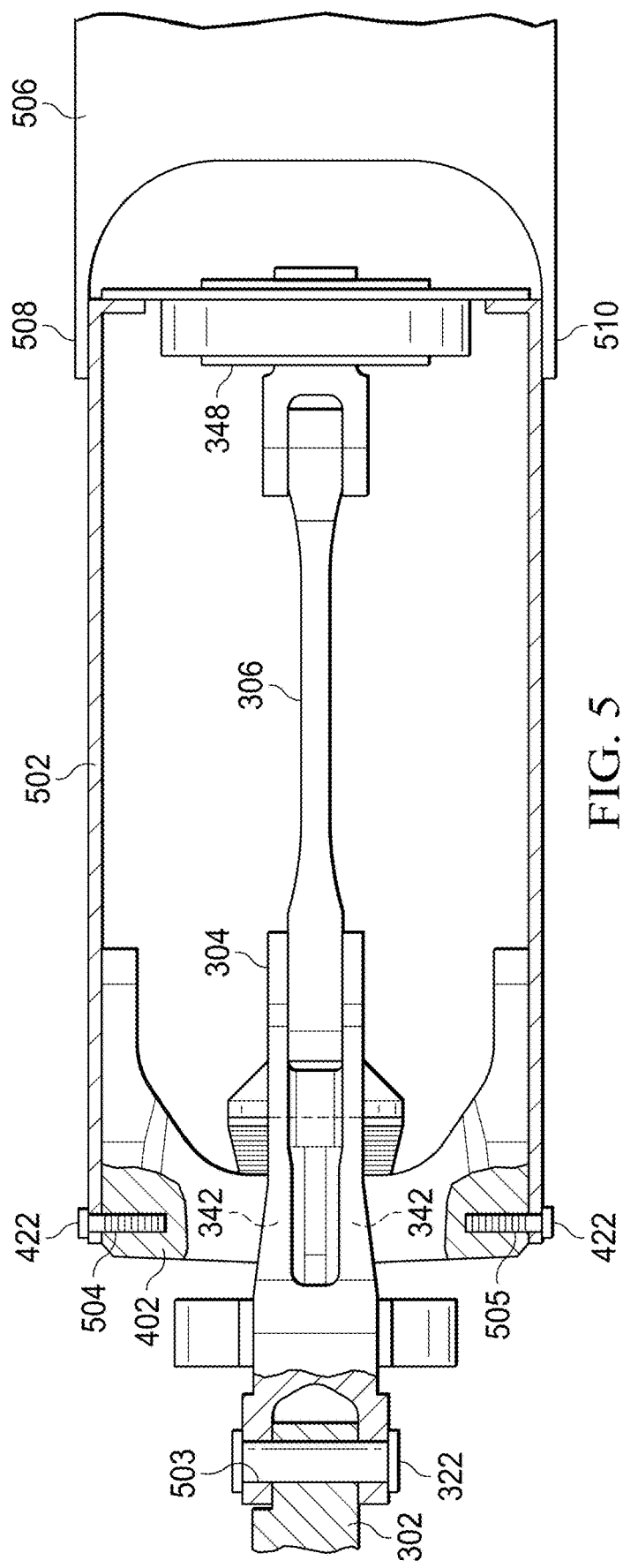
FIG. 5 is a schematic of a rotor blade connected to a tri-hybrid yoke according to one or more aspects of the disclosure.

Referring to FIG. 5, a schematic of a rotor blade assembly including a rotor blade connected to tri-hybrid yoke 300 is shown. CF fitting 304 is connected to center ring 302 with CF bolts 322. CF joint 503 connects CF fitting 304 to center ring 302 with CF bolt 322 and CF bushing 321. Inboard beam 402 of inboard bearing assembly 340 extends through cut-out 342 in CF fitting 304 and is connected to grip 502. CF joints 504, 505 connect grip 502 to inboard beam 402 with CF bolt 422 and CF bushing 421. CF bolts 422 within CF bushings 421 and CF mounting holes 420 are manufactured to higher tolerances than the mounting hardware used in mounting holes 416, 417 that also connect inboard beam 402 to grip 502. As a result, at CF joints 504, 505 only CF bolts 422 or CF bushings 421 carry the CF load from grip 502 through to inboard beam 402. The mounting hardware used in mounting holes 416, 417 that also connect inboard beam 402 to grip 502 do not carry CF load. CF joints 504, 505 are positioned within cut-out 342 of CF fitting 304 and inboard of flexure arm 306. Outboard bearing assembly 348 connects flexure arm 306 to grip 502 and blade tangs 508, 510 of rotor blade 506. Alternatively, grip 502 is not present and rotor blade 506 extends to inboard bearing assembly 340 where CF joints 504, 505 connect blade tangs 508, 510 to inboard beam 402 while rotor blade 506 connects to outboard bearing assembly 348 outboard of blade tangs 508, 510.

Outboard bearing assembly 348 includes a shear bearing. The connection between flexure arm 306 and outboard bearing assembly 348 does not carry any CF load. The CF load path of rotor blade 506 is from blade tangs 508, 510 to grip 502; through CF bolts 422 or CF bushings 421 of CF joints 504, 505; to inboard beam 402; through CF bearing 404 to CF fitting 304; and through CF bolts 322 or CF bushings 321 of CF joint 503 to center ring 302. Alternatively, in the absence of the grip, the CF load path of rotor blade 506 is from blade tangs 508, 510; through CF bolts 422 or CF bushings 421 of CF joints 504, 505 to inboard beam 402; through CF bearing 404 to CF fitting 304; and through CF bolts 322 or CF bushings 321 of CF joint 503 to center ring 302. The connection of grip 502 or rotor blade 506 to tangs 412, 414 of inboard beam 402 provides a double shear condition. The double shear condition prevents any rotational moment about the connection of the grip or rotor blade to the inboard beam at each CF bolt 422 created by centrifugal forces acting on the rotor blade during blade assembly rotation. The metal material of CF fitting 304 provides greater strength than a yoke manufactured entirely of composite material. The stronger tri-hybrid yoke 300 is capable of withstanding the CF loads via an inboard bearing assembly.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within [a percentage] of" what is specified, as understood by a person of ordinary skill in the art.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A tri-hybrid yoke for a rotorcraft, comprising:
   a center ring connected to a centrifugal force ("CF") fitting at a first CF joint, the first CF joint comprising a double shear connection;
   a flexure arm connected to the CF fitting, wherein the CF fitting is constructed of a different material from the center ring and the flexure arm;
   a second CF joint positioned within the CF fitting proximate the center ring and inboard of the flexure arm;
   an inboard beam including a first tang and a second tang extending from a bridge, where the first tang is vertically aligned with the second tang;
   a shaft extending from the bridge toward the center ring;
   a cavity in the bridge opposite the shaft;
   a CF bearing held by and between the cavity and the CF fitting;
   a clamp plate attached to the CF fitting;
   an inboard shear bearing attached to the shaft and held by the clamp plate; and
   an outboard bearing assembly connected to the flexure arm, wherein the tri-hybrid yoke is configured to connect to a rotor blade at the second CF joint and the outboard bearing assembly whereby in use a CF load path of the tri-hybrid yoke is through the center ring, the first CF joint, the CF fitting, and the second CF joint, wherein the CF load path does not include the flexure arm or the outboard bearing assembly or a grip.

2. The tri-hybrid yoke of claim 1, further comprising:
   a cut-out in the CF fitting; and
   a CF pocket, where the CF pocket is a unitary portion of the CF fitting within the cut-out.

3. The tri-hybrid yoke of claim 1, further comprising:
   a CF pocket, formed by the CF fitting, including a first conical cavity; and
   the CF bearing held by and between the first conical cavity and the cavity, wherein the CF bearing is axially centered within the first conical cavity and the cavity.

4. The tri-hybrid yoke of claim 3, further comprising:
   a tab extending from the CF bearing engaged with a slot in the first conical cavity.

5. The tri-hybrid yoke of claim 1, wherein the CF fitting further comprises:
   a cut-out proximate the center ring;
   a CF pocket formed by the cut-out; and
   a weight pocket.

6. The tri-hybrid yoke of claim 1, wherein the CF fitting is constructed of a metal.

7. The tri-hybrid yoke of claim 1, wherein the flexure arm is connected to the CF fitting by a double shear connection.

8. The tri-hybrid yoke of claim 1, wherein the CF fitting is constructed of a metal; and
   the flexure arm is connected to the CF fitting by a double shear connection.

9. A rotor blade assembly of a rotorcraft, comprising:
   a center ring including a central aperture;
   a drive shaft connected to the center ring at the central aperture;
   a centrifugal force ("CF") fitting connected to the center ring at a CF joint, the CF joint comprising a double shear connection;
   a flexure attached to the CF fitting opposite the center ring, wherein the CF fitting is constructed of a different material from the center ring and the flexure;
   an inboard beam including a first tang and a second tang extending from a bridge, where the first tang is vertically aligned with the second tang;
   a shaft extending from the bridge toward the center ring;
   a cavity in the bridge opposite the shaft;
   a CF bearing held by and between the cavity and the CF fitting;
   a clamp plate attached to the CF fitting;
   an inboard shear bearing attached to the shaft and held by the clamp plate;
   a rotor blade connected to the CF bearing;
   an outboard bearing assembly comprising an outboard shear bearing, the outboard bearing assembly connected to the flexure and the rotor blade; and
   a CF load path of the rotor blade assembly through the CF bearing, the CF fitting, the CF joint, and the center ring, wherein the CF load path does not include the flexure or the outboard bearing assembly or a grip connected between the CF bearing and the rotor blade.

10. The rotor blade assembly of claim 9, wherein the CF fitting further comprises a cut-out proximate the center ring and the CF bearing is connected to the CF fitting in the cut-out.

11. The rotor blade assembly of claim 9, further comprising a CF pocket formed by the CF fitting and including a first curved surface.

12. The rotor blade assembly of claim 9, further comprising:
    a CF pocket, formed by the CF fitting, including a first conical cavity; and
    the CF bearing held by and between the first conical cavity and the cavity, wherein the CF bearing is centered within the first conical cavity and the cavity when the CF bearing is under compression by a CF load created by rotation of the rotor blade assembly.

13. The rotor blade assembly of claim 9, wherein the CF fitting further comprises:
    a cut-out proximate the center ring and the CF bearing extends through the cut-out;
    an CF pocket formed in the cut-out; and
    a weight pocket.

14. The rotor blade assembly of claim 9, wherein the flexure is attached to the CF fitting by a double shear connection.

15. The rotor blade assembly of claim 9, wherein the CF fitting is constructed of a metal.

16. The rotor blade assembly of claim 9, wherein the flexure is attached to the CF fitting by a double shear connection; and
    the CF fitting is constructed of a metal.

17. A tri-hybrid yoke for a rotorcraft, comprising:
    a center ring connected to a centrifugal force ("CF") fitting by a double shear connection;
    a flexure arm connected to the CF fitting, wherein the flexure arm is constructed of a different material from the CF fitting;
    a cut-out in the CF fitting, inboard of the flexure arm, including a CF pocket;
    a first curved surface formed in the CF pocket;

an inboard beam including a shaft extending from a bridge and a second curved surface in the bridge opposite the shaft;

a CF bearing held by and axially centered between the first curved surface and the second curved surface;

a shear bearing attached to the shaft and constrained by a clamp plate attached to the CF fitting; and an outboard bearing assembly connected to the flexure arm, wherein the tri-hybrid yoke is configured to connect to a rotor blade at the CF bearing and the outboard bearing assembly whereby in use a CF load path of the tri-hybrid yoke is through the inboard beam, the CF fitting, the center ring, and the CF bearing, wherein the CF load path does not include the flexure arm or the outboard bearing assembly or a grip.

18. The tri-hybrid yoke of claim 17, further comprising a slot in the first curved surface and a tab extending from the CF bearing engaged with the slot.

19. The tri-hybrid yoke of claim 17, wherein the CF fitting is constructed of a metal.

20. The tri-hybrid yoke of claim 17, wherein the flexure arm is connected to the CF fitting by a double shear connection.

* * * * *